E. P. EARLE.
CAMERA.
APPLICATION FILED AUG. 9, 1917. RENEWED FEB. 8, 1919.

1,298,312.
Patented Mar. 25, 1919.
2 SHEETS—SHEET 1.

Inventor:
Elias P. Earle,
by Parker Cook
Atty.

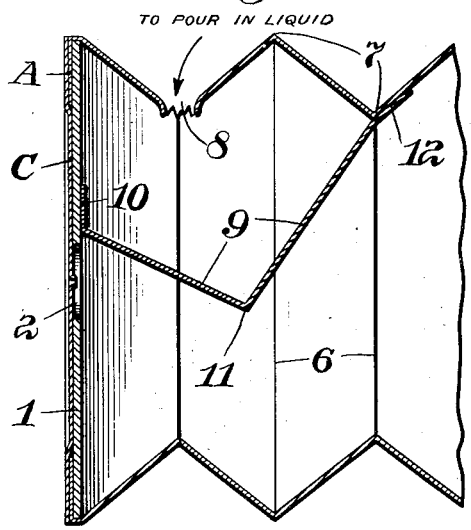
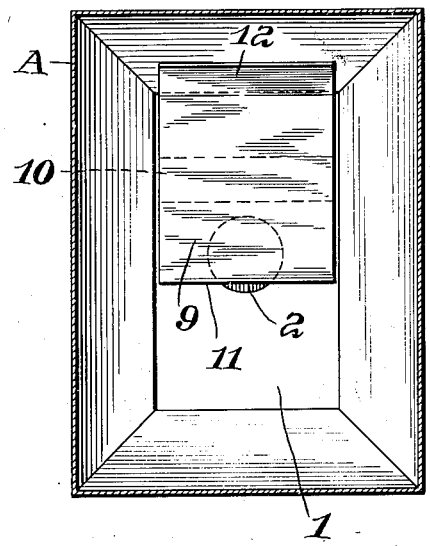
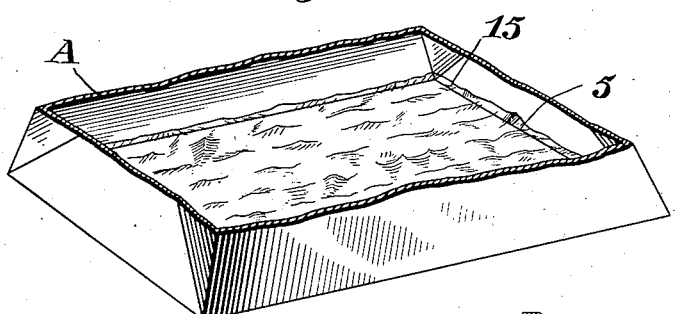
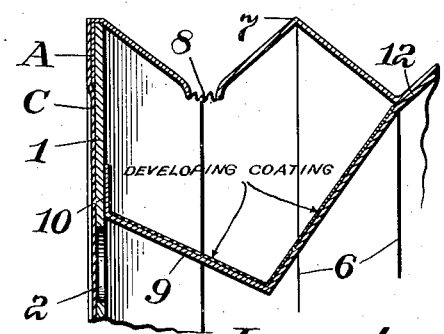
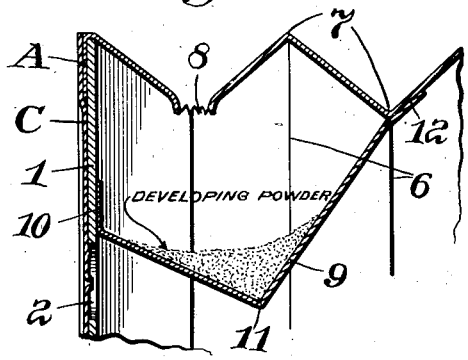

UNITED STATES PATENT OFFICE.

ELIAS P. EARLE, OF TOWNVILLE, SOUTH CAROLINA.

CAMERA.

1,298,312.   Specification of Letters Patent.   Patented Mar. 25, 1919.

Application filed August 9, 1917, Serial No. 185,255. Renewed February 8, 1919. Serial No. 275,848.

*To all whom it may concern:*

Be it known that I, ELIAS P. EARLE, a citizen of the United States, residing at Townville, in the county of Oconee and State of South Carolina, have invented certain new and useful Improvements in Cameras, of which the following is a specification.

My invention relates to a new and useful improvement in cameras.

One of the objects of my invention is to produce a small camera that may be constructed of a thin material such as paper or fabric and that may be folded into a convenient flat form occupying less than a quarter of an inch in cross section so that it may be slipped into the vest pocket or coat pocket.

Another object of my invention is to produce a camera that may be manufactured at the cost of but a few cents and which, after one picture has been taken, may be discarded.

Another object of my invention is to produce a camera that may be constructed of paper and which requires no lens whatever.

Still another object of my invention is to provide a camera as above described wherein after the camera has been opened and a pin stuck through the paper over the opening thereof, a flap of paper will come down over this opening when the camera is again closed so that no undesirable light will pass into the camera after the exposure has been made.

Still another object of my invention is to produce a camera wherein the developer may be carried within the camera so that it will only be necessary to punch or force another opening in the top of the camera through which water may be poured and the image on the sensitized surface may be developed directly in the camera, thereby avoiding the necessity of developing in a dark room.

Still another object of my invention is to provide a camera where the developer may be carried directly in the camera either in a powdered form or in a coated surface form, so that it is only necessary to pour water in the camera; or, if desired, a separate solution may be poured in the camera rather than have the developing powder or coated surface directly in the camera.

Still another object of my invention is to produce a camera that will take but the one exposure. However, the camera is so cheap to construct that even after destroying the camera the cost of the photograph is such that it is in no way prohibitive from a commercial standpoint.

With these and other objects in view my invention consists in certain new and novel construction and combination of parts as will be hereinafter more fully described and pointed out in the claims.

Referring now to the drawings forming part hereof, which show the preferable embodiments of my invention, Figure 1 is a perspective of the camera in its open position.

Fig. 4 is a fragmentary vertical sectional view showing the upper portion perforated for the reception of a fluid and showing the paper flap in a partly open position.

Fig. 5 is a transverse sectional view from the rear showing the flap covering the perforation.

Fig. 6 is a perspective view of the rear of the camera in a developing position, and showing the fluid on the sensitized surface, the remaining portion of the camera being torn away.

Fig. 7 is a fragmentary vertical sectional view showing a developing powder carried by the flap, and the flap in a partly open position.

Fig. 8 is also a fragmentary vertical section in this instance, showing a developer in the form of a coating on the paper flap.

Figure 1:
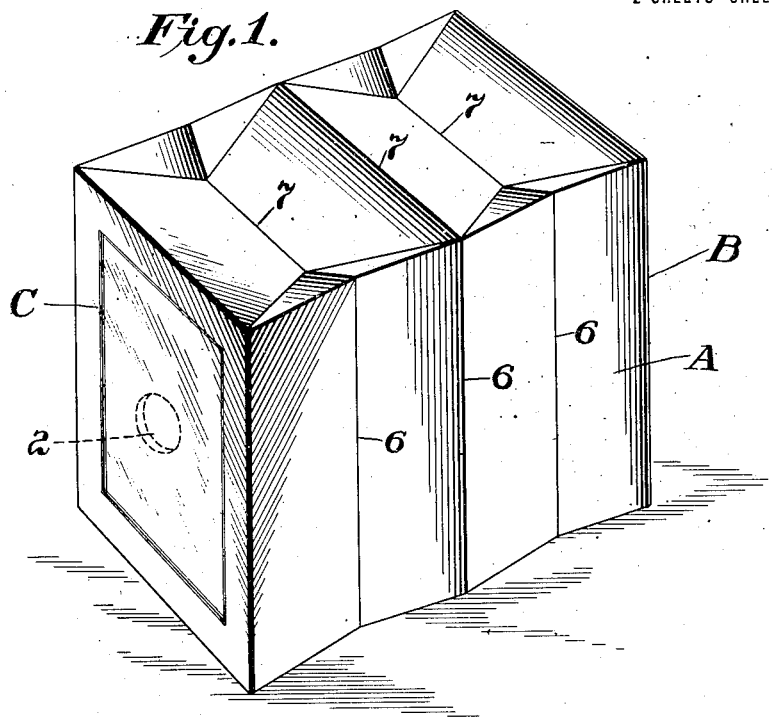

Referring now to the drawings, it will be seen that my camera first consists of what might be termed a rectangular box, that is, a front board 1 is shown which is preferably made of card-board and in which there is an opening 2 located centrally thereof. A back board 3 is also shown which is preferably formed of card-board and on its front surface there is shown a small area of paste or glue 4 to which is stuck a sensitized element 5, which may be a tin type plate, sensitized post card, or other photograph plate, although the tin type or sensitized card is preferably used.

Fastened around the sides of these two boards 1 and 3 is the covering A which is preferably made of black paper and is creased on its sides as at 6 and at its top and bottom as at 7, so that the folds may contact and the front board 1 may be moved close to the back board 3.

The edges of this paper A are glued over the outer edges of the front and rear boards 1 and 3 and a paper covering B is then pasted over the rear surface of the back board and over the edges of the element 5, (that, as before mentioned, are pasted along the rear edges of the back board) this back covering being simply for the purpose of giving the camera a finished appearance.

A covering C is also pasted over the front surface of the front board which will cover the marginal edges of the sides A that are pasted along the front edges of the front board and furthermore, this front covering also covers and protects the opening 2 in the front board so that the entire camera when assembled is impervious to light.

To protect this front opening after the same has been perforated and the element exposed, a flap of paper 9 is shown, one edge 10 of which is pasted to the rear surface of the front board 1 at a short distance above the opening 2. This paper flap 9 is creased at 11 and the other end 12 is pasted to the inner surface of the covering A at its top and near the rear board.

Figure 2:
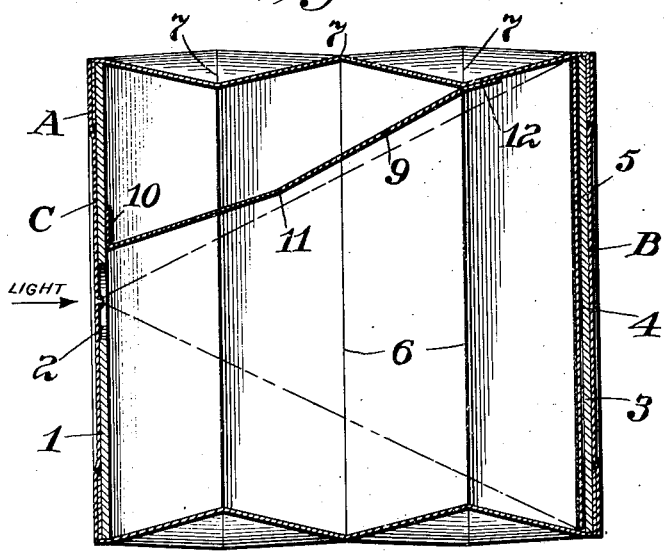
Fig. 2 is a vertical sectional view of the same showing the camera in its open position and having the front perforated and the flap pulled up.

From this construction it will be seen that when the camera is in its open position as clearly shown by Fig. 2, the flap 9 is drawn upwardly and away from the opening 2 and also out of the way of the light rays that are to strike the element which is pasted to the rear board 3.

Figure 3:
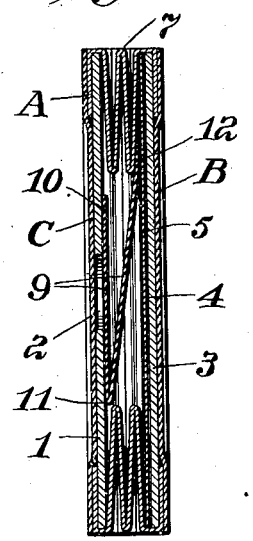
Fig. 3 is also a vertical sectional view but the camera, in this instance, is in its folded or closed position.

When the camera is in its closed position however, as clearly shown by Fig. 3, the flap 9 extends downwardly in front of the opening 2 so that no more light is admissible to the camera. Furthermore, when it is desired to pour a fluid into the camera to develop the sensitized element a perforation 8 may be made between the first folds of the covering A and at the top, the flap 9 which extends nearly across the entire front of the camera preventing any light from this perforation reaching the element fastened to the rear board 3.

Again, as shown in Fig. 7, if desired a soluble coarse powder may be placed on this flap 9 (of course before the camera is assembled) so that when desired to develop the negative all that will be necessary is to pour through a punctured opening 8 in the top a small amount of water.

If desired, as shown in Fig. 8, this flap might be covered with a coating which coating of course would consist of the soluble substance for developing the negative, with the addition of some material that would hold the developer in the form of a coating.

In Fig. 6 I have shown the camera with a major portion of the same torn away leaving simply a small portion of the covering A and back board 3 to which is pasted the element 5 and showing a solution 15 covering the element.

After the negative is finally developed the remaining portion of the covering A may be torn away and the negative simply forced away from the back board 3.

Of course the element 5 will have to be pasted to the back board in a darkened room; the preferable form of developing powder will then be added to the flap and the covering A will then be pasted to the front and back boards, and the front and rear covers will then be pasted over the outside of the front and rear boards.

To operate the camera it is only necessary to open the same, stand away from the object and stick a pin through the front cover in front of the opening 2, expose the sensitized surface of the element 5 for a number of seconds and then close the camera, which is done, by simply pressing the front board toward the rear one, the folds 7 and flap 9 assuming the positions shown in Fig. 3.

One of the front folds at the top is then perforated, and it is to be seen that the same really acts as a funnel, so that the water or other fluid in passing through the same will contact with the flap and the powder or coating thereon. The camera is then turned to a horizontal position and tilted back and forth to develop the image on the element 5 that is fastened to the rear board. The major portion of the camera is then torn away and after the image is fully developed the remaining portion is removed from the element 5.

From the foregoing it will be seen that I have produced a camera that may be manufactured at the cost of but a few cents; one wherein the developer may be carried or contained within the camera; one wherein the image may be developed within the camera, and one wherein the camera is destroyed after the image is developed.

It will also be seen that I have produced a camera whereby a dozen of them might be conveniently carried in the pocket, as they occupy but little space and when folded are not thick in cross section.

Furthermore, no special dark room is necessary for the developing of the picture, in fact, it can be developed *in situ* in the camera while the camera is in the light.

Having thus described my invention, what I claim as new and desire to secure by Letters Patent, is:—

1. A foldable camera comprising a front and a rear board connected by a bellows, a sensitized surface within said camera and removably secured to said rear board, said front board being provided with an opening, a paper covering over said front board and said opening, means secured to the inner portion of said bellows and said front board for protecting the said opening when said camera is in its folded condition.

2. A camera comprising a foldable box which is impervious to light, a puncturable paper at the front of the box, a sensitized surface located in the box, and a developing material contained in a dry form within the box.

3. A camera comprising a front and a rear board, a covering extending between said front and rear boards, and adapted to collapse in a certain predetermined position, the front board being provided with an opening, a paper covering over said opening, a flap in said camera and fastened at one of its ends to the front board and at its other end to the top of the first mentioned covering and near the rear thereof so that said flap will be held above said opening when the camera is in its open position and will cover said opening when the camera is in its closed position.

4. A camera comprising a front and a rear board, said front board being provided with a centrally located opening, a paper covering over the outside of said opening, a paper flap having one of its ends fastened directly above said opening and its other end fastened to the covering, said flap being creased to fold substantially centrally of its length to cover said opening when the camera is collapsed and to be positioned above said opening throughout its length when the camera is in its open position and said flap extending substantially across the transverse dimension of said camera.

5. A camera comprising a front and a rear board, a collapsible impervious covering extending between said boards, a sensitized element removably secured to the inner surface of said rear board and a developing material located within said camera.

6. A camera formed entirely of paper and cardboard, said camera comprising a front and a rear board, a collapsible paper covering between said boards, a sensitized element carried by said rear board, the front board being adapted to be pierced when desired to expose said element, and one of the top folds of said collapsible paper covering being adapted to be pierced for the insertion of a developer to develop said sensitized element.

7. A camera comprising a front and a rear board, both formed of card-board, a collapsible paper covering inclosing said front and rear boards, a sensitized element located within the boards, said front board being provided with an opening, a paper covering over said opening, said covering being adapted to be pierced to expose said sensitized element, a flap secured within said camera and adapted to cover said opening when said camera is in its closed position and to be held above said opening when the camera is in its open position, a developing material carried on said flap, said first mentioned covering being adapted to be pierced in its top and between the ends of said flap for the insertion of a fluid to dissolve said developing material.

In testimony whereof I affix my signature.

ELIAS P. EARLE.